May 26, 1931. W. H. BROOKS 1,807,193
VALVE
Filed July 16, 1928
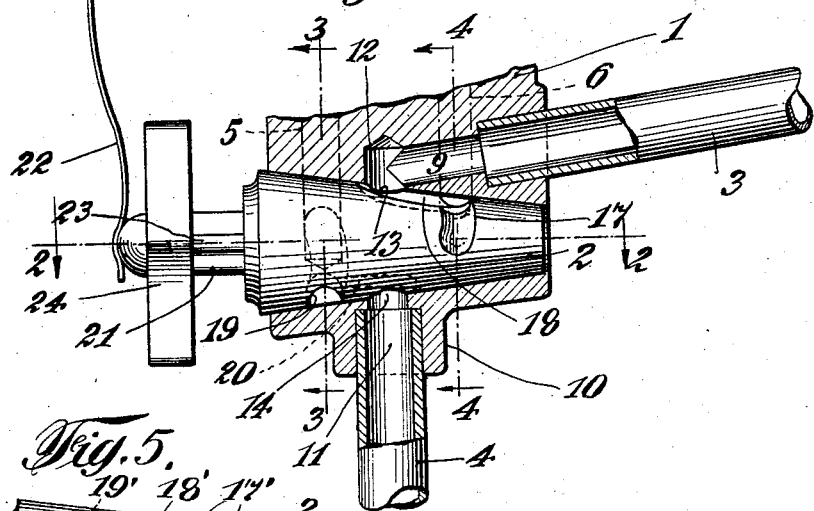
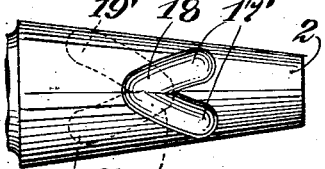
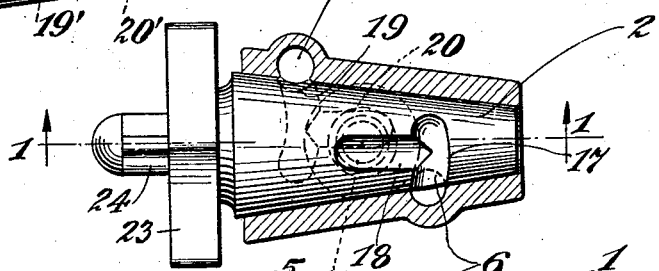
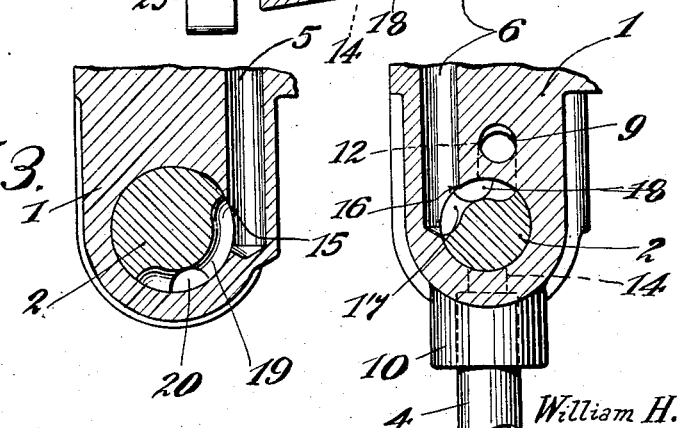
INVENTOR
William H. Brooks
BY
his ATTORNEY Patented May 26, 1931

1,807,193

UNITED STATES PATENT OFFICE

WILLIAM H. BROOKS, OF OCONOMOWOC, WISCONSIN, ASSIGNOR TO CARNATION COMPANY, OF OCONOMOWOC, WISCONSIN, A CORPORATION OF DELAWARE

VALVE

Application filed July 16, 1928. Serial No. 293,169.

My invention relates to improvements in valves, especially valves for controlling the flow of fluids.

An object of the invention is to provide a valve of the rotary or oscillating type so constructed and related to the seat thereof as to be very durable and capable of having a snug operating fit and of giving long and efficient service.

A further object of the invention is to provide a valve of this type formed with passages for the flow of the fluid and designed to eliminate wear to the greatest possible extent; also to render uniform that degree of wear which is unavoidable; thus making frequent replacing and refitting unnecessary.

Other objects and advantages of the invention will be set out in the following description taken with the drawings in which the preferred embodiment of my invention is illustrated. But the disclosure is explanatory only and I may make changes in details without departing from the principle of the invention or exceeding the scope of the appended claims.

In the drawings, Figure 1 is a vertical section through a valve according to my invention taken on the line 1—1 of Fig. 2 the valve being shown in elevation;

Fig. 2 is a section taken on the line 2—2 of Fig. 1 the valve being shown in elevation;

Fig. 3 is a section taken on the line 3—3 of Fig. 1;

Fig. 4 is a section taken on the line 4—4 of Fig. 1; and

Fig. 5 shows a modification.

At 1, I show a casing for the valve which is provided with a bore from one end to the other to receive the body of the valve 2; which is conical and the inside surface of the bore in the casing 1 will, of course, afford a smooth and snug fit so that while the valve can be turned in the casing, it will nevertheless be leak-proof. Into the casing leads a pipe or conduit 3 from one end and another pipe or conduit 4 is connected to the bottom of the casing. At 5 and 6 are additional channels formed in opposite sides of the casing 1 in radial planes spaced apart along the axis of the valve. The two channels 5 and 6 may be regarded as connected to different sources of supply of liquids and are each to be connected separately to the pipe 4. The casing is bored to provide a channel 9 shouldered to receive the end of the conduit 3, and the end of the conduit 4 is fitted into a boss 10 bored out as at 11. The inner end of the channel or passage 9 connects with a space 12 which leads to a port 13 opening through the side of the seat for the valve 2, and the bore 11 opens through a similar port 14 on the opposite side of the valve seat. The space 12 may be in actual alignment with the bore 11 and this bore and space may be formed either by casting or by running a drill through the boss 10 across the bore which receives the valve 2 to open up the inner end of the passage 9. The channels 5 and 6 communicate with the bore receiving the valve 2 through ports 15 and 16 in the seat for this valve.

In practice it is desirable to connect the passage 9 with either the channel 6 or the channel 5, and to connect the conduit 4 with the other channel 5 or 6. Hence I provide the valve 2 with a circumferential channel 17 in the same transverse plane as the channel or passage 6 and this channel connects with a longitudinal channel or groove 18 of the valve. On the opposite side of the valve, I also form a peripheral groove 19 in the same plane as the passage or channel 5, and this groove connects with a longitudinal groove 20. If the peripheral groove 17 or 19 were straight, the turning of the valve would cause wear over the inside surface of the seat, except along those parts which are opposite the grooves 17 and 19. I, therefore, prefer to make these grooves 17 and 19 curved, as clearly shown in Fig. 2, and thus the actual area of contact between the valve and its seat is increased. This curvature can be made as great as possible so as to cause the convex edge of each groove 17 and 19 to approach and even reach a line drawn between the ends of the concave edge. Thus when the valve is turned or oscillated, there will be little or no part of the surface of the seat between the two edges of each groove 17 and 19 that is not directly engaged by the conical surface of the valve 2. With such complete contact, the wear of the valve against the surface of the seat is very even and uniform, and undue wear along any part of the seat adjacent the grooves 17 and 19 is obviated. Thus the valve is capable of lasting a long time and does not have to be removed for refitting or replacing except at infrequent intervals. The result would be far different if the opposite edges of the grooves 17 and 19 were straight, because then there would always be a part of the valve seat which makes no contact with the valve as it is turned and the wear on this part will be the least; while the wear on the remaining parts of the seat would be relatively great.

In the position of the valve as shown in the drawings, communication is established between conduit 3, passage 9, port 13, grooves 18 and 17, port 16 and passage 6; also between passage 5, port 15, groove 19, groove 20, port 14 and conduit 4. Upon the valve being turned to the required extent, however, the port 13 can be connected by the grooves 19 and 20 to the port 15, to put passage 5 and conduit 3 into communication; and the passages 17 and 18 will then be in position to connect the ports 14 and 16 to put into communication the passage 6 and conduit 4. The grooves 17 and 19, of course, are of the necessary length to establish the communications desired.

The stem of the valve is indicated at 21 and spring 22 bears against the end of the stem to hold the valve in place. This spring can be mounted in any fixed part and the valve 2 can be rotated or oscillated by any suitable mechanism engaging projections 23 and 24 on the stem 22.

The valve as described is very efficient and keeps good contact with the seat without wear over long periods. This result is due, as above described, to the transverse grooves or elongated recesses 17 and 19 being curved along their longitudinal parallel edges; that is, in the direction of the length of these grooves, with the relative movement of the valve and seat being in the same direction to make the wear on the seat uniform and even, as the valve and seat with their cooperating parts and recesses are given relative movement.

In Fig. 5 I show the grooves or recesses in the valve 2 as comprising a pair of divergent grooves 17' meeting at 18'; and on the opposite side of the valve are similar diverging grooves 19' meeting at 20'. The grooves 17' extend toward one end of the valve and the grooves 19' towards the opposite end. This construction will operate the same as the construction above described to connect the port 13 with the port 16 and the port 15 with the port 14; also the port 13 with the port 15 and the port 14 with the port 16. The triangular projection between each pair of divergent grooves extends in between the ends of these grooves a considerable distance toward the opposite end of the valve and thus the wear on the seat is uniform and even as before.

What I claim as new is:—

1. The combination of a casing having a bore, a valve received in said bore and engaging the inside surface thereof as a seat, said casing having channels on opposite sides of the bore and communicating therewith through ports, said channels being spaced apart along the axis of the valve, said seat also having ports above and below the valve between said channels, conduits leading to said last named ports, the valve having transverse grooves adjacent each of said channels and longitudinal grooves communicating with the transverse grooves to connect said channels and conduits with said ports, the transverse grooves being shaped so as to make the wear of the valve uniform on said seat.

2. The combination of a casing having a conical bore, a conical valve received in said bore and engaging the inside surface thereof as a seat, said casing having channels at opposite sides of the bore and communicating therewith through ports, said channels being spaced apart along the axis of the valve, said seat also having ports above and below the valve between said channels, conduits leading to said last named ports, the valve having transverse grooves adjacent each of said channels and longitudinal grooves communicating with the transverse grooves to connect said channels and conduits with said ports, the transverse grooves being shaped so as to make the wear of the valve uniform on said seat, by curving the transverse grooves between their ends.

3. A valve having a seat engaging surface provided with a transverse groove and a longitudinal groove intersecting the transverse groove adjacent the middle, the transverse groove being curved longitudinally of the valve.

4. A flow reversing valve including a casing and rotary valve member mounted therein, said casing having passages spaced from each other axially of the casing and communicating with the casing bore at opposite sides thereof, and said casing being further provided at opposite sides of its bore and between said passages with inlet and outlet ports respectively, and said rotary valve member being provided in its periphery with axially spaced means whereby either of said passages may be connected with the inlet port or the outlet port.

5. A flow reversing valve including a casing and rotary valve member mounted therein, said casing having passages spaced from each other axially of the casing and communicating with the casing bore at opposite sides thereof, and said casing being further provided at opposite sides of its bore and between said passages with inlet and outlet ports respectively, and said rotary valve member being provided in its peripheral surface and on opposite sides thereof with grooves for establishing communication between either of said passages and the inlet port or the outlet port, and said grooves being formed to produce substantially uniform wear upon the valve seat in the rotary movements of the valve member.

In testimony that I claim the foregoing as my invention, I have signed my name hereto.

WILLIAM H. BROOKS.